United States Patent
Morikawa et al.

(10) Patent No.: US 6,404,523 B1
(45) Date of Patent: Jun. 11, 2002

(54) WAVELENGTH DIVISION MULTIPLEXING SYSTEM AND ITS TERMINATION

(75) Inventors: Hajime Morikawa; Shin-ichirou Harasawa, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/236,631

(22) Filed: Jan. 26, 1999

(30) Foreign Application Priority Data

May 19, 1998 (JP) .......................................... 10-136921

(51) Int. Cl.⁷ .......................... H04J 14/02; H04B 10/00
(52) U.S. Cl. ....................... 359/124; 359/127; 359/161; 359/164
(58) Field of Search ................................ 359/110, 124, 359/127, 130, 153, 161, 164, 187

(56) References Cited

U.S. PATENT DOCUMENTS 5,790,289 A 8/1998 Taga et al. .................. 359/124

FOREIGN PATENT DOCUMENTS

| EP | 0818894 A2 | 1/1998 |
| EP | 0829980 A2 | 3/1998 |
| JP | 08-321824 A | 12/1996 |

OTHER PUBLICATIONS

S. Watanabe, et al., "Design Method of Channel Pre–emphasis for Long Haul WDM Transmission Systems", ACOFT '96, pp. 49–52, Dec. 1996.

*Primary Examiner*—Leslie Pascal
*Assistant Examiner*—Dalzid Singh
(74) *Attorney, Agent, or Firm*—Staas & Halsey LLP

(57) ABSTRACT

A computer for controlling a pre-emphasis process is provided at end terminal stations which are the terminal stations of a trunk. When a pre-emphasis process is performed to an optical signal directing from a terminal station to another terminal station, the computer of the terminal station controls the process. First, the terminal station causes another terminal station to transmit the spectrum information of the thus-received optical signal, and receives the information. The terminal station obtains the spectrum information of its own received optical signal. The terminal station arranges data for each transmission source of the received optical signal, and calculates the amount of a pre-emphasis process to be performed at a transmission side. The terminal station transmits pre-emphasis execution instructions to the other terminal stations according to the thus-calculated results.

10 Claims, 14 Drawing Sheets

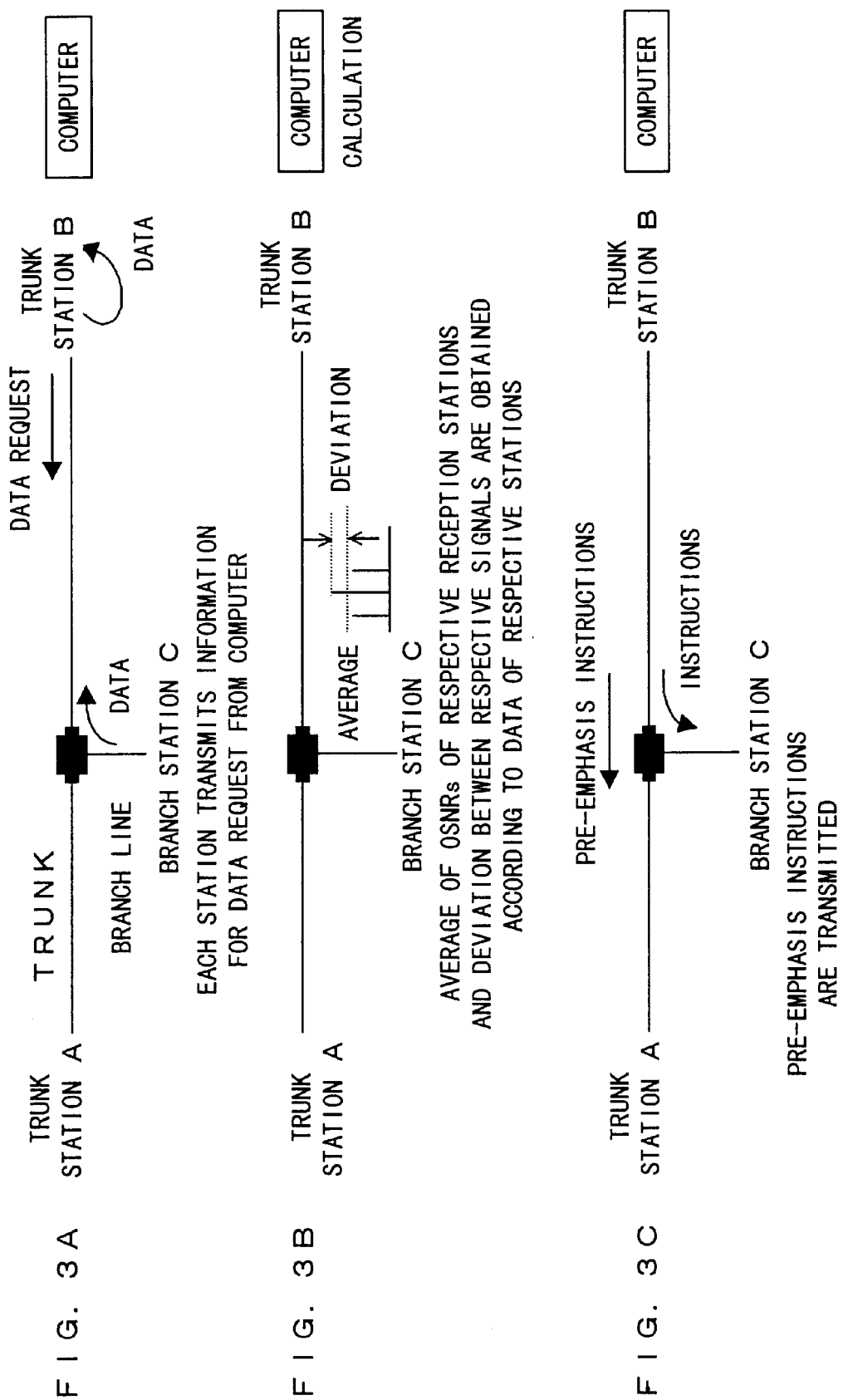

| Channel \ RECEIVING STATION | T1 | B1 | B2 | ---- | BN | T2 |
|---|---|---|---|---|---|---|
| Ch 1 | | — | T1 | | | |
| Ch 2 | | T1 | B1 | | | |
| .... | | | | | | |
| Ch n | | | | | | |

FIG. 6A

| Channel \ TRANSMISSON STATION | T1 | B1 | B2 | ---- | BN | T2 |
|---|---|---|---|---|---|---|
| Ch 1 | D(B2)1 | — | | | | |
| Ch 2 | D(B1)2 | D(B2)2 | | | | |
| ---- | | | | | | |
| Ch n | | | | | | |
| $Ave_s(T)$ | | | | | | |

FIG. 6B

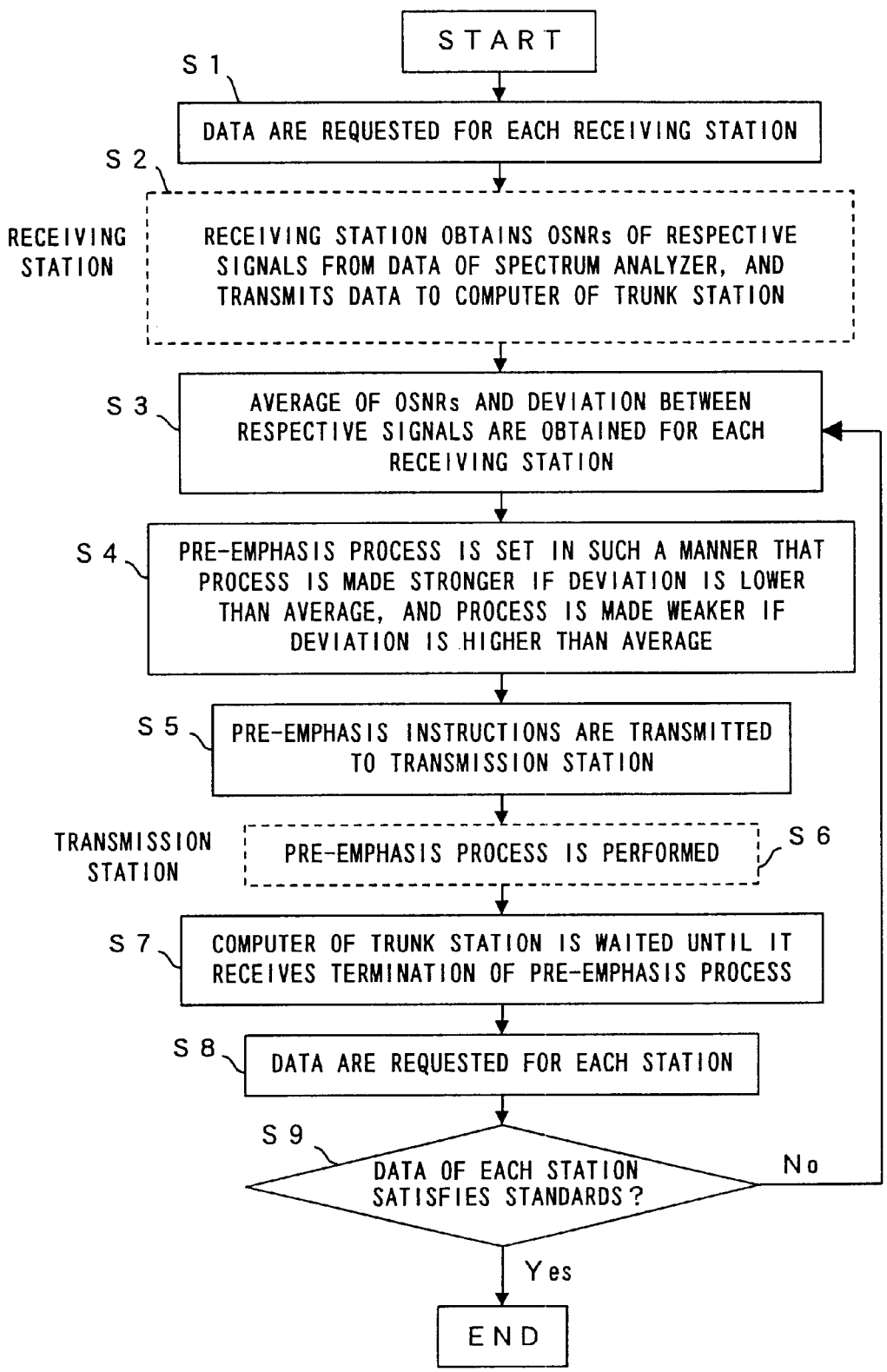
F I G. 1 1

WAVELENGTH DIVISION MULTIPLEXING SYSTEM AND ITS TERMINATION

BACKGROUND OF THE INVENTION

1. Field of the Invention

The present invention relates to a wavelength division multiplexing (WDM) optical communication system.

2. Description of the Related Art

Recently, in order to greatly increase the transmission capacity of a communication line, a WDM optical communication system has been actively studied and developed. In the WDM optical communication system, each channel is allocated to a light of a different wavelength, the light of each wavelength is modulated, and the wavelengths are multiplexed to be transmitted. Transmission characteristics of the communication system are measured by the SN ratio (OSNR) of an optical signal. Even if the levels of the optical signals of respective wavelengths are matched with each other to be transmitted on a transmission side, they become different on a reception side, due to the gain characteristics of an optical relay or the like, which is provided in a transmission path. That is, since the OSNR of the optical signal of a specific wavelength deteriorates among optical signals which are multiplexed many times, the transmission characteristics of a system are evaluated by the worst OSNR although the optical signal of a wavelength having a good OSNR is present. Therefore, in the WDM optical communication system, when an optical signal is received at a receiving station, all the OSNRs of the optical signals of wavelengths are required to be similarly good values. A pre-emphasis technology is adopted for adjusting the OSNRs of optical signals of respective wavelengths, which are received at the receiving station side, to be almost at the same level.

FIGS. 1A and 1B are diagrams explaining a pre-emphasis technology.

FIG. 1A shows a case where a pre-emphasis process is not performed on a transmission side. That is, the power levels of optical signals of respective wavelengths are matched to be transmitted. The OSNRs of the thus-transmitted optical signals deteriorate because of the gain characteristics of an optical ampliifier (relay) which is provided in a transmission path. That is, when the optical signal is amplified by the optical amplifier, an ASE (Amplified Spontaneous Emission) is added to the optical signal as noise, and the gain characteristics of the optical amplifier become different depending on the wavelength position where optical signals of respective wavelengths are located, as shown in the middle of FIG. 1A, so that a level difference between optical signals is generated. Therefore optical signals of different levels with noise added will be received for each wavelength, on a reception side. The right side of FIG. 1A shows such a condition. Accordingly, a deviation is generated in the OSNRs of the optical signals.

FIG. 1B is a diagram explaining a case where pre-emphasis is performed on a transmission side.

When a pre-emphasis process is performed, the following operations are performed, and the optical signals are transmitted. The power of an optical signal of a wavelength whose OSNR deteriorates when it is received on a reception side, is preliminarily increased. By contrast, the power of the optical signal of a wavelength whose OSNR has not deteriorated so much when it is received, is relatively decreased. When such a wavelength-multiplexed optical signal is transmitted, the optical signal of a wavelength having a relatively low power at a transmission time, is greatly amplified in a transmission path. However, the optical signal of a wavelength of a relatively high power at a transmission time is only slightly amplified. Accordingly, optical signals of wavelengths whose power levels are relatively equal can be received on a reception side. The right side of FIG. 1B shows such a condition. As shown in the middle of FIG. 1B, gain characteristics are strong around the center, and they become smaller further from the center. Therefore, when a pre-emphasis process is performed, the power level of an optical signal of a wavelength located at the periphery of a gain band is adjusted to be increased.

Really, since there is scarcely any case where the gain characteristics of all of the transmission paths are preliminarily recognized, it is adjusted how to perform a pre-emphasis process, taking into account the state of an optical signal on a reception side. Since noise together with an optical signal are received on a reception side, a state where the OSNRs of optical signals of respective wavelengths are equal is more preferable to a transmission characteristic than a state where the power levels of optical signals of respective wavelengths are equal. Therefore, the OSNRs between wavelengths are adjusted to be matched with each other when optical signals are received in a pre-emphasis process.

Recently, in order to more flexibly correspond an optical communication network to users' requests, a configuration of an optical add/drop multiplexing (OADM) system has been required. In this system, the optical signal of a specified wavelength is branched into a transmission path for connecting two trunk stations which are terminal stations of the trunk transmission path, so that the thus-branched optical signals are transmitted to another terminal station (branch station), or an optical signal of the specified wavelength transmitted from the branch station is inserted to the trunk transmission path. In the OADM system, a branching unit (BU) for branching and inserting a specified wavelength into/to a transmission path is provided. The branching unit to be used in an OADM system is called an OADM BU.

In a system where an OADM BU is not included such as a linear network for connecting two terminal stations which face to each other, a deviation of OSNRs for the optical signals of respective wavelengths can be controlled only by performing a strong pre-emphasis process to the optical signals of lower OSNRs of the opposite station, and by performing a weak pre-emphasis process to those of high OSNRs. Therefore, a person can easily perform such a pre-emphasis process by hand.

In a system including the OADM BU system, however, since a plurality of stations determine how great a pre-emphasis process is performed, very complicated procedures are required so that time and labor are also required when a person performs such a pre-emphasis process by hand. Therefore, the deviation of OSNRs cannot be controlled because of deterioration caused by insertion of a cable, deterioration with time, and the failure of a transmission path, even if the amount of a pre-emphasis process to be performed for each wavelength is initially set. Accordingly, this will be a big problem especially in a long distance transmission system.

Even if each receiving station individually performs a pre-emphasis process in order to control the deviation in the receiving station, pre-emphasis processes can hardly converge since optical signals affect each other in a transmission path. Conventionally, there is no method for performing a pre-emphasis process in short time. Therefore, a method for realizing this process has been required.

SUMMARY OF INVENTION

The subject of the present invention is to provide a system for automatically perform a pre-emphasis process in short time in a WDM optical communication network where a plurality of terminal stations are connected.

The present invention comprises (1) a first terminal station having a control means for terminating a trunk transmission path in a WDM optical communication system where a plurality of terminal stations are connected by a network, and for controlling a pre-emphasis process which is performed at a terminal station for transmitting optical signals among terminal stations included in the WDM optical communication system, (2) a branching and inserting means for branching and inserting the optical signal of a predetermined wavelength among wavelength-multiplexed optical signals which propagate through the trunk transmission path, and (3) a second terminal station connected to the branching and inserting means, for receiving the optical signal of the predetermined wavelength from the trunk transmission path, and for transmitting the optical signal of the predetermined wavelength to be inserted to the trunk transmission path. The present invention is characterized in that when a pre-emphasis process is performed for a wavelength-multiplexed optical signal to be transmitted in such a direction that the first terminal station becomes a reception terminal station in the wavelength division multiplexing optical system, the control means obtains the spectrum information of an optical signal received by the first terminal station, causes the second terminal station to transmit the spectrum information of an optical signal to be received by the first terminal station, obtains the spectrum information received from the second terminal station, and instructs a terminal station which transmits an optical signal about how great a pre-emphasis process should be performed, using the spectrum information which is obtained from the first and second terminal stations.

In a wavelength division multiplexing system having a network configuration where a plurality of branch transmission paths are provided at a trunk transmission path, and one or more terminal stations are connected to the branch transmission path, a terminal station of the present invention is one connected to the trunk transmission path. This terminal station of the present invention is characterized in that it obtains, from a terminal station which receives a wavelength division multiplexed optical signal, spectrum information of the thus-received optical signal by the terminal station, and it comprises a control means for instructing how great a pre-emphasis process should be performed for a terminal station for transmitting an optical signal according to the spectrum information.

According to the present invention, since pre-emphasis processes of terminal stations which are connected to a system are simultaneously controlled by a control means which is provided at a single terminal station, no confusion occurs when controlling the pre-emphasis processes. Therefore, the processes can be terminated in short time.

Since a pre-emphasis process is automatically performed by the control means, it is not necessary for a person to perform complicated operations spending relatively a long time. Accordingly, the present invention can obtain a good cost performance.

BRIEF DESCRIPTION OF THE DRAWINGS

FIGS. 3A to 3C are diagrams explaining the flow of a pre-emphasis control process according to the embodiments of the present invention (No. 1);

FIGS. 6A and 6B are diagrams explaining a data processing to be performed by the computer in a trunk station;

FIG. 11 is a flowchart showing a process to be performed when the computer of a trunk station performs a pre-emphasis control;

DESCRIPTION OF THE PREFERRED EMBODIMENTS

Figure 2:
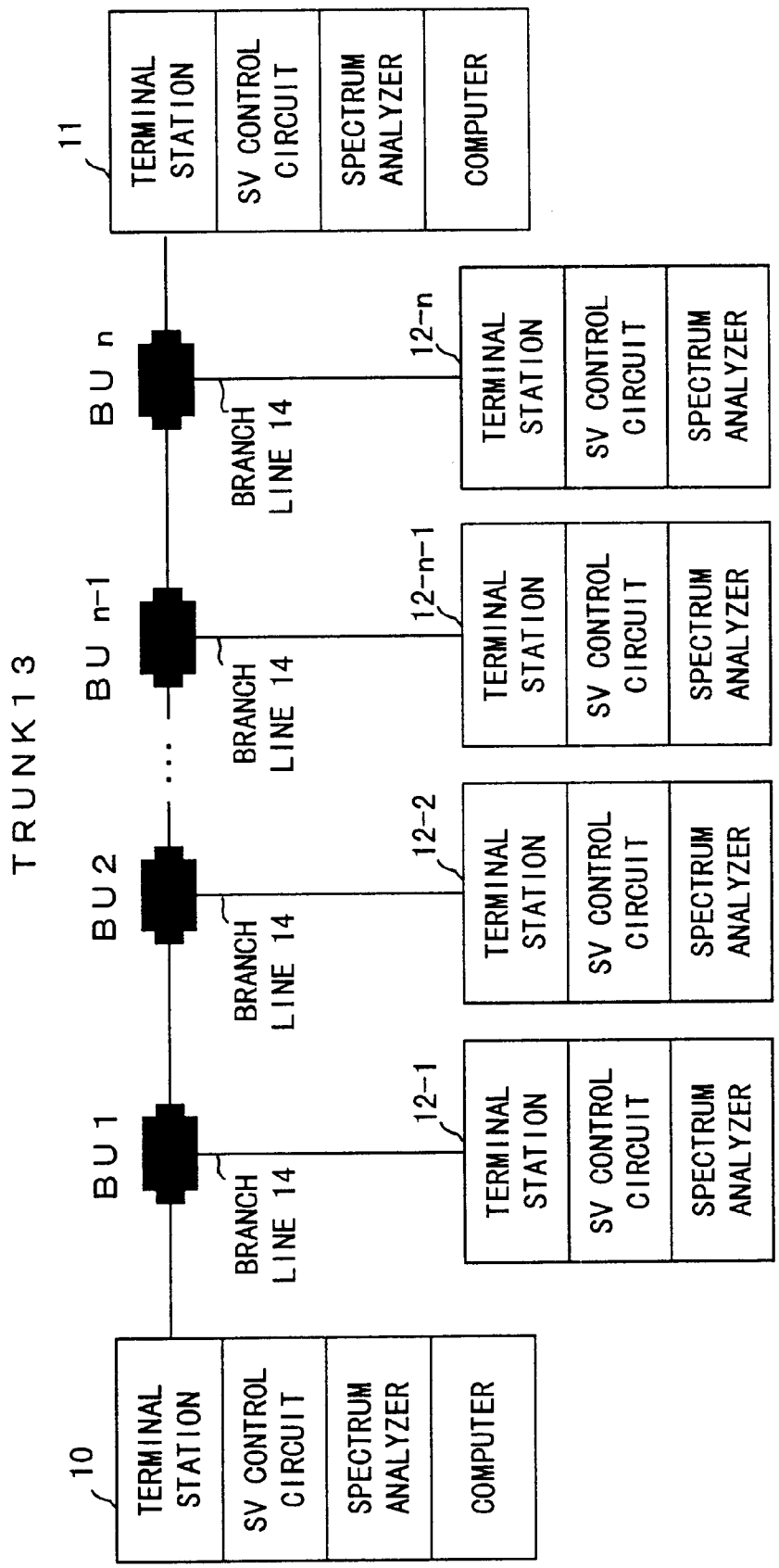
FIG. 2 is a diagram showing the principle configuration of a system of the present invention.

FIG. 2 is a diagram showing the principle configuration of a system of the present invention.

In a configuration shown in FIG. 2, a trunk 13 connects both a terminal station 10 and a terminal station 11 (trunk stations). In the middle of the trunk 13, branching units BU1 to BUn for pulling branch lines 14 from the trunk 13 are provided. Terminal stations 12-1 to 12-n (branch stations) are connected to the branching units BU1 to BUn, respectively. At the terminal stations 10 and 11, and the terminal stations 12-1 and 12-n, an SV control circuit is provided for controlling the transmission and reception of a monitor control signal (SV signal) which transmits and receives control information. After the SV signal is sent from either of the two terminal stations, it is transmitted in the branch line 14 and the trunk 13, and is terminated at a terminal station which sends this SV signal after circulating all the terminal stations 10 and 11, and 12-1 and 12-n.

At the terminal stations 10, 11, and 12-1 and 12-n, a spectrum analyzer is provided for obtaining spectrum information of the thus-received wavelength division multiplexed signal. When a pre-emphasis is performed, each terminal station obtains the spectrum information of the optical signal which is received in its own terminal station, via the spectrum analyzer, and transmits the thus-obtained information to the terminal station 10 or the terminal station 11 for performing a control.

At the terminal stations 10 and 11 which are trunk stations, computers are provided for controlling the pre-emphasis processes of an entire network. According to the embodiment of the present invention, a trunk station which becomes a transmission station of the trunk 13 simultaneously controls pre-emphasis processes. In FIG. 2, the trunk 13 and the branch line 14 are represented by a single line. Actually, however, a set of the transmission paths is configured by an upstream line and a downstream line. Accordingly, if a direction from the terminal station 10 to the terminal station 11 is set as a downstream line, the terminal station 11 performs a pre-emphasis process for the downstream line, and a computer provided at the terminal station 11 collects spectrum information of optical signals received by all the terminal stations. When a pre-emphasis process is performed for the upstream line, similarly, the terminal station 10 collects spectrum information of optical signals received by the respective terminal stations and performs a pre-emphasis process. Therefore, the terminal stations 12-1 and 12-n which are connected to the branch line 14 perform pre-emphasis processes for optical signals to be transmitted by their own terminal stations. However, these terminal stations do not control how great these pre-emphasis processes should be performed, and receive control signals from the terminal station 10 or the terminal station 11 so that they control the pre-emphasis amounts to be applied to the optical signals which are transmitted from their own terminal stations, according to the instructions of the control signals.

FIGS. 3A to 3C, and 4A and 4B are diagrams explaining the flows of pre-emphasis control processings according to the embodiments of the present invention.

In FIGS. 3A to 3C, and 4A and 4B, assume a case where a pre-emphasis process is performed for an optical signal which directs from a trunk station A to a trunk station B. In this case, a computer provided at the trunk station B instructs which terminal station should perform how great a pre-emphasis control is performed.

As shown in FIG. 3A, the computer of the trunk station B outputs a data request for each terminal station to transmit information about how the spectrum information of the received optical signal is processed, to a branch station C (also to branch stations which are not shown, other than the station C). At this time, the trunk station B measures the spectrum information of an optical signal which is received by its own station, and stores the thus-measured information.

Each terminal station which receives the data request obtains the spectrum information of an optical signal which is received in its own station using a spectrum analyzer, and transmits the results to the trunk station B using the SV signal of a facing line.

As shown in FIG. 3B, a computer of the trunk station B which receives spectrum information from respective terminal stations obtains the average of OSNRs of the respective receiving stations, and the deviation (or ratio) of the OSNRs of optical signals of respective wavelengths. Here, the computer performs a predetermined process and determines which terminal station should perform how great pre-emphasis process. This predetermined process will be described later.

Next, a pre-emphasis instruction is sent from the trunk station B to each terminal station (in the case of FIG. 3C, the trunk station A and the branch station C). This pre-emphasis instruction is also transmitted using an SV signal.

Figure 4A:
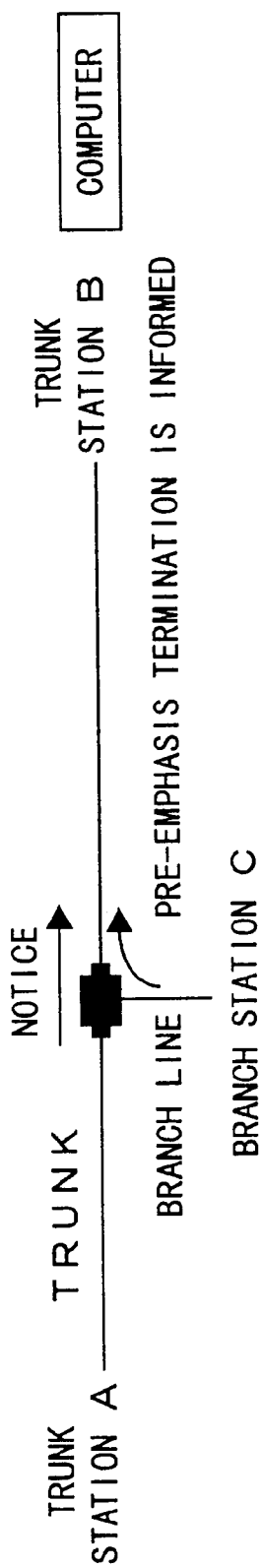
FIGS. 4A and 4B are diagrams explaining the flow of a pre-emphasis control process according to the embodiments of the present invention (No. 2)
Figure 4B:
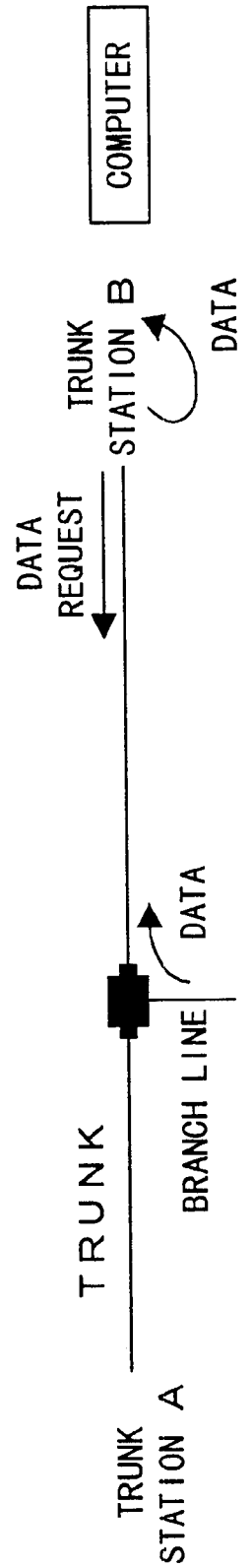

When a pre-emphasis process is terminated in each termination station, it informs the trunk station B of the pre-emphasis process termination using the SV signal, as shown in FIG. 4A. At this point, the flow of one cycle of a pre-emphasis control process is terminated. Next, in FIG. 4B, a computer of the trunk station B sends a data request for each branch station to transmit the spectrum information of a received optical signal. As for this data request, each terminal station (branch station C) obtains spectrum information using a spectrum analyzer, and transmits the thus-obtained data to the trunk station B. The trunk station B obtains the spectrum information of an optical signal which is received by its own station. The computer analyzes these data, determines whether or not the pre-emphasis process of each station is properly performed. If the pre-emphasis process is not properly performed, the above-mentioned processes are repeated until the OSNR of each optical signal becomes proper. When the computer detects that the pre-emphasis process is properly performed, all the processes are terminated.

Figure 5:
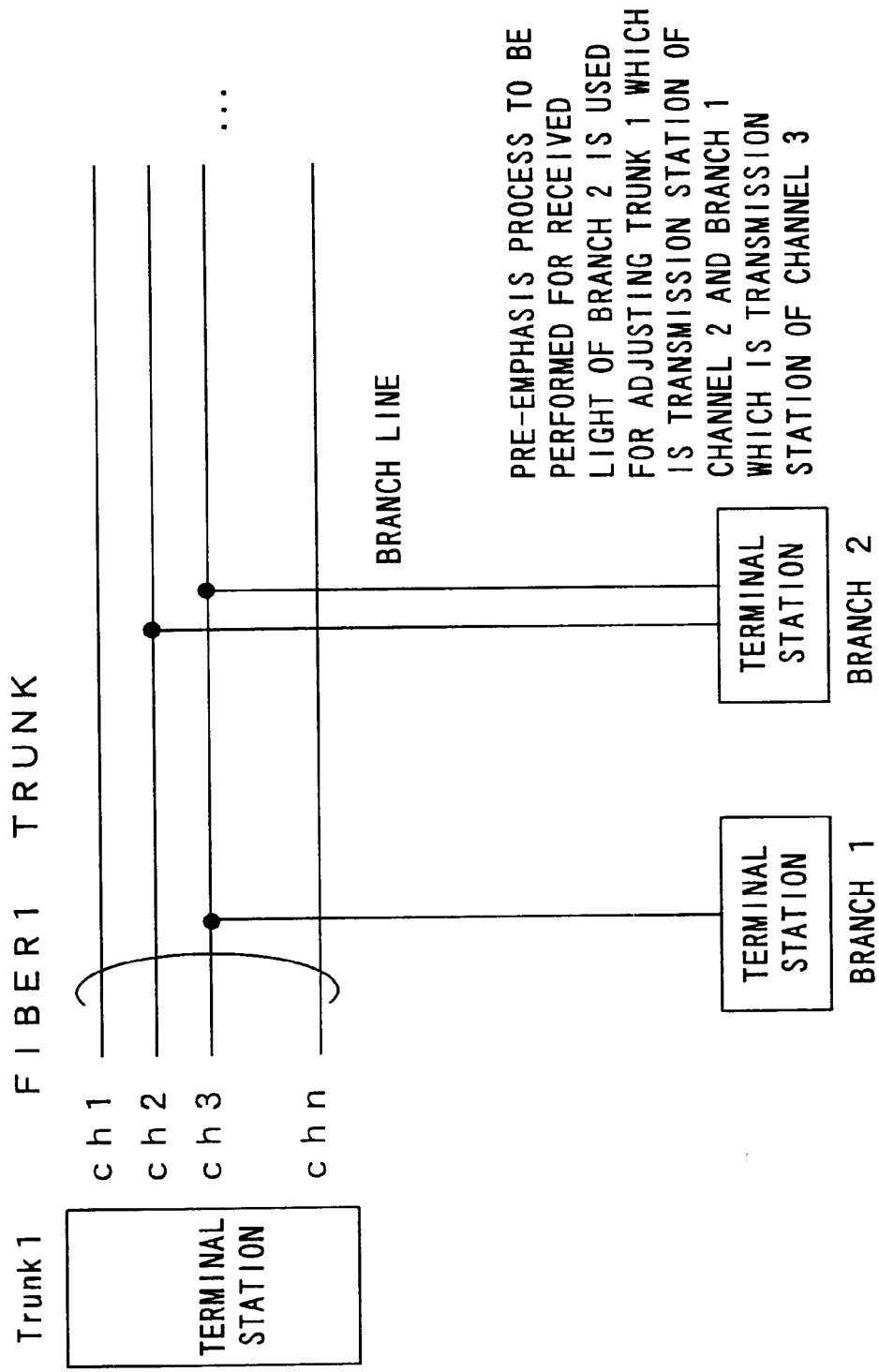
FIG. 5 is a diagram explaining a case where a pre-emphasis process is performed in a terminal station other than a trunk station.

FIG. 5 is a diagram explaining a case where a pre-emphasis process is performed in a station other than the trunk station.

In FIG. 5, channels 1 to n are wavelength-multiplexed to be transmitted from a terminal station Trunk 1 to a single fiber of the trunk. In FIG. 5, a branching unit is not shown, but the black circle indicates a function of the branching unit. That is, the optical signal of a channel 2 is branched into a terminal station Branch 2, and an optical signal of the channel 2 is inserted from the terminal station Branch 2. Further, the optical signal of a channel 3 is branched into a terminal station Branch 1, and an optical signal of the channel 3 is inserted from the terminal station Branch 1. The optical signal of the channel 3 is branched into a terminal station Branch 2, and an optical signal of the channel 3 is inserted from the terminal station Branch 2. Accordingly, the optical signal of the channel 3 transmitted from the terminal station Trunk 1 is terminated at the terminal station Branch 1. Further, the optical signal of the channel 3 transmitted from the terminal station Branch 1 is terminated at the terminal station Branch 2. Thus, in an OADM system, there is an optical signal to be transmitted from a branch station to another branch station. Therefore, a pre-emphasis process should be performed taking these circumstances into consideration.

That is, since the optical signal of the channel 2 is transmitted from the terminal station Trunk 1, and is terminated in the terminal station Branch 2, the OSNR of an optical signal of the channel 2 is measured in the terminal station Branch 2, and the terminal station Trunk 1 can properly control a pre-emphasis process according to the thus-measured results. In the case of the channel 3, however, there is an optical signal to be transmitted from the terminal station Branch 1 to the terminal station Branch 2. Therefore, a pre-emphasis process cannot be completely performed by the terminal station Trunk 1, and the terminal station Branch 1 should perform a pre-emphasis process. In this case, it can be thought that a computer is provided at the terminal station Branch 2, and the control instruction of a pre-emphasis process is performed in the terminal station Branch 1 independently of the terminal station Trunk 1. If such a configuration is adopted, pre-emphasis processes are independently controlled in many stations of a network so that a control becomes complicated, and the pre-emphasis process cannot be converged into an optimum pre-emphasis amount. A computer facing the terminal station Trunk 1 simultaneously estimates how great a pre-emphasis is performed, and the terminal station Branch 1 performs a pre-emphasis control according to the control contents which are transmitted from a trunk station facing the terminal station Trunk 1.

FIGS. 6A and 6B are diagrams explaining data processings to be performed by the computer of a trunk station.

As mentioned above, a trunk station which performs a data processing for a pre-emphasis control transmits a request for each terminal station of a network to transmit the spectrum information of a received optical signal. When the spectrum information is received, the number of channels ($N_R$ (T)) which are received at a receiving station (T), the average OSNR ($Ave_R$ (T)) of a receiving station (T), and the OSNR ($OSNR_i$ (T)) of a channel i are stored as data. Here, T represents a number of the terminal station (T1, B1, B2, ..., BN, and T2). The average OSNR at a receiving station (T) can be obtained from the following $$Ave_R(T) = \frac{\sum_{i=1}^{n} OSNR_i(T)}{N_R(T)}$$

Next, a ratio of the average OSNR to the OSNR of each channel is obtained for each receiving station.

$$D_i(T)=Ave_R(T)/OSNR_i(T)$$

Then, signals which are received at each reception channel and stations which receive these signals are managed by a table shown in FIG. 6A. In this. table, the terminal station number of a terminal station which transmits optical signals received in the receiving station is registered. In this figure, Ti is a trunk station, and Bi is a branch station. According to FIG. 6A, as for a channel 1, a trunk station T1 is registered as a transmission station in the section of a receiving station B2. As for channel 2, an optical signal received by the terminal station B1 is transmitted from a terminal station T1, and an optical signal received by the terminal station B2 is transmitted from the terminal station B1.

Next, a table shown in FIG. 6B is prepared by re-arranging the above-obtained ratios for each transmission station, according to the table shown in FIG. 6A. For example, when a receiving station is read from the table shown in FIG. 6A in the case where a transmission station is T1, B2 is a receiving station for the channel 1, and B1 is a receiving station for the channel 2. Therefore, in a table shown in FIG. 6B, a ratio D (B2) 1 of the OSNR at the receiving station B2 is registered in a section of the transmission station T1 and the channel 1. A ratio D (B2) 2 of the OSNR at the receiving station B1 is registered in an intersection of the transmission station T1 and the channel 2. Similarly, the receiving station of signals of the channel 2 which are transmitted from the terminal station B1 is B2 in a case where a transmission station is B6, according to the table shown in FIG. 6A. Accordingly, a ratio D (B2) 2 of the OSNR at the receiving station B2 is registered in the intersection of the transmission station B6 and the channel 2 in the table shown in FIG. 6B. The similar data are registered in FIG. 6B, which is not shown in this figure.

Then, the average value of ratios of OSNRs is obtained for each transmission station, with reference to the table shown in FIG. 6B.

$$Ave_s(T) = \frac{\sum_{i=1}^{n} D(T)_i}{N_s(T)}$$

Here, Ns (T) is the number of channels transmitted from a transmission station (T), $Ave_S$ (T) is the average of ratios of OSNRs at the transmission station (T), and T is a station number similarly to the above-mentioned.

Further, a ratio of the above-obtained average $Ave_S$ (T) to a ratio D (T) i of the OSNR of each channel which is registered in the section of the transmission station, is obtained. If this is converted into decibel units, the following equation will be obtained.

$$P(T)_i = 10 \log\left(\frac{Ave_s(T)}{D(T)_i}\right)$$

The above P (T) i is a pre-emphasis amount for the transmission station channel i. Since P (T) i uses a ratio to the average $Ave_S$ (T), it is not considered to increase the power of all of the channels to be transmitted from a transmission station or decrease this power. Therefore, this process is performed by adjusting the levels of dummy lights which are transmitted together with a main signal transmitted from the transmission station. The dummy light adjusts the power levels of all of the main signals by increasing and decreasing the power level of the dummy light, making use of a fact that an optical amplifier is performing ALC operations. That is, when the power level of the dummy light is increased, the power level of all of the main signals is decreased. When the power level of the dummy light is decreased, the power level of all of the main signals is increased.

The adjustment amount of the power level of the dummy light is obtained in decibel units as follows:

$$P_{dummy}(T)=-10 \log\{Ave_S(T)\}$$

It is described that levels of all of the optical signals to be transmitted from a transmission station are adjusted using dummy light. However, the levels only for 10 log $\{Ave_S (T)\}$ (decibel) can be varied by using an optical amplifier or an optical attenuator instead of dummy light.

Figure 7:
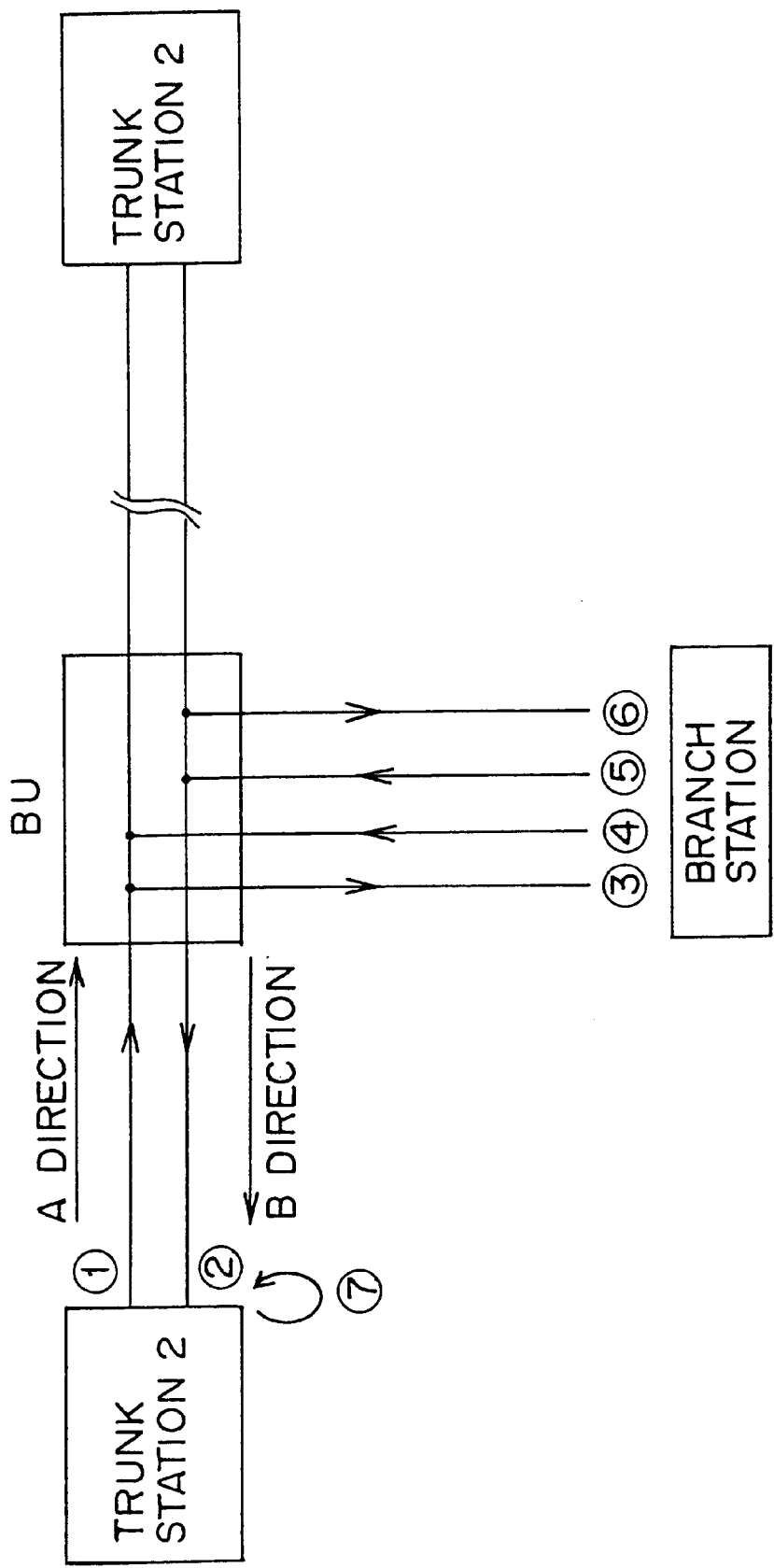
FIG. 7 is a diagram showing the flow of data request commands and data.

FIG. 7 is a diagram showing the flow of data request instructions and data.

Here, a case where the pre-emphasis process of an optical signal which is transmitted from a trunk station 2 to a trunk station 1, that is, in a B direction, is explained. In FIG. 7, a single branch station is provided, but the flow is the same when a plurality of branch stations are provided.

The trunk station 1 first transmits data request commands (1). These commands are transmitted to a branch station side by a branching unit BU (3) to be received. The branch station analyzes the OSNR of a line (6) by a spectrum analyzer, and obtains spectrum information. Then, the thus-obtained spectrum data are transmitted from (5) on an SV signal. This information is received at (2) of the trunk station 1. The spectrum information of an optical signal which is received at the trunk station 1 via a line (2) is analyzed at the trunk station 1 using the spectrum analyzer to be stored in its own station (7).

When a pre-emphasis process is performed for the optical signal of a B direction in the sate where an upstream line and a downstream line are provided, the trunk station 1 which is a receiving station of the optical signal of the B direction performs the control of a pre-emphasis process. Similarly, when a pre-emphasis process is performed for the optical signal of an A direction, the trunk station 2 which is a receiving station of an optical signal of the A direction performs the control of a pre-emphasis process. The flow of data and commands is the same as the above-mentioned flows, but the direction is the inverse and the line is different.

It is explained in the above-mentioned that the trunk station on a reception side performs the control of a pre-emphasis process, but the trunk station on a transmission side can perform the control of a pre-emphasis process. In this case, commands are issued for transmitting spectrum information to the trunk station on a reception side. Here, a trunk station which controls a pre-emphasis process on a transmission side need not obtain the spectrum information of an optical signal received in its own station.

Figure 8:
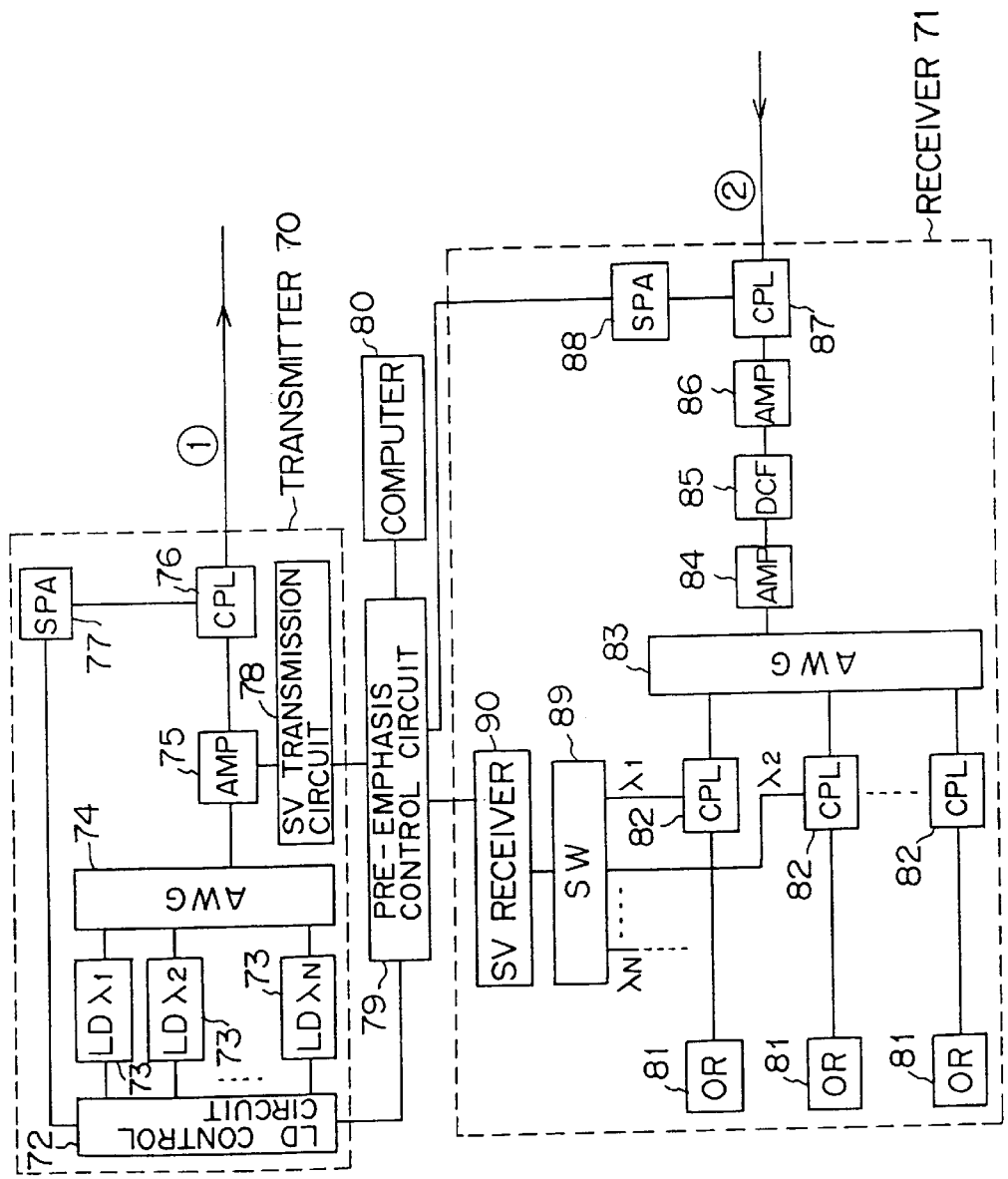
FIG. 8 is a diagram showing the configuration example of a trunk station.

FIG. 8 is a diagram showing the configuration example of a trunk station.

The circled numbers shown in FIG. 8 correspond to those shown in FIG. 6.

A trunk station which functions as a terminal station is composed of a transmitter 70 and an receiver 71. The transmitter 70 is provided with a laser diode LD 73 of wavelengths λ1 to λn, which is a light source of optical signals. They are driven by an LD control circuit 72. These optical signals outputted from the LD control circuit 72 are wavelength-multiplexed by an AWG (Arrayed Waveguide Grating) 74 which is a coupler. The wavelength-multiplexed optical signal is amplified by an optical amplifier 75 to be inputted to a coupler 76. An SV transmission circuit 78 is connected to the optical amplifier 75, controls the amplification ratio of the optical amplifier 75, and superimposes the SV signal on the main signal.

A part of optical signals outputted from the optical amplifier 75 is branched at the coupler 76 to be inputted to a spectrum analyzer 77. The spectrum analyzer 77 obtains the spectrum information of an optical signal transmitted from the transmitter 70, detects whether or not a desirable spectrum is obtained, and the thus-detected results are fedback to the LD control circuit 72. The LD control circuit 72 adjusts the output level of the LD73 of each wavelength according to the information transmitted from the spectrum analyzer 77. In the case of adjusting a pre-emphasis process, the LD control circuit 72 detects whether or not the process is properly performed, and the thus-detected results are fedback to the pre-emphasis control circuit 79 to be used for realizing an optimum pre-emphasis process.

The receiver 71 branches a part of transmitted optical signals at a coupler 87, and transmits this to a spectrum analyzer 88. The spectrum analyzer obtains the spectrum information of the thus-received optical signals and the information about the control of a pre-emphasis process. After optical signals which pass through a coupler 87 are amplified by an optical amplifier 86, they are compensated for transmission path dispersions by a dispersion compensation fiber 85, and they are amplified by the optical amplifier 84 again. The reason why an optical amplifier is provided at a downstream of the dispersion compensation fiber 85 is to compensate for the loss of the dispersion compensation fiber.

Optical signals outputted from the optical amplifier 84 are inputted to an AWG 83 which is a demultiplexer to be branched into optical signals of respective wavelengths. The optical signal of each wavelength is branched by a coupler 82, the optical signal of a single wavelength is selected by an optical switch 89, and an SV signal is received by an SV receiver 90. Spectrum information about the respective stations is included in this SV signal. The main signal of an optical signal which passes through the coupler 82 is received by an optical receiver 81.

The spectrum information obtained by an spectrum analyzer 88 and that transmitted by the SV signal are inputted to a pre-emphasis control circuit 79, and the above-mentioned processes are performed by a computer 80. The processed results are returned to the pre-emphasis control circuit 79 again to be converted into pre-emphasis control signals, and these control signals are applied to the LD control circuit 72. The LD control circuit 72 adjusts the output of LD73 according to the pre-emphasis control signals and performs a desired pre-emphasis control. In order to normally execute the pre-emphasis process, an automatic control is performed by the above-mentioned feedback processes.

Figure 9:
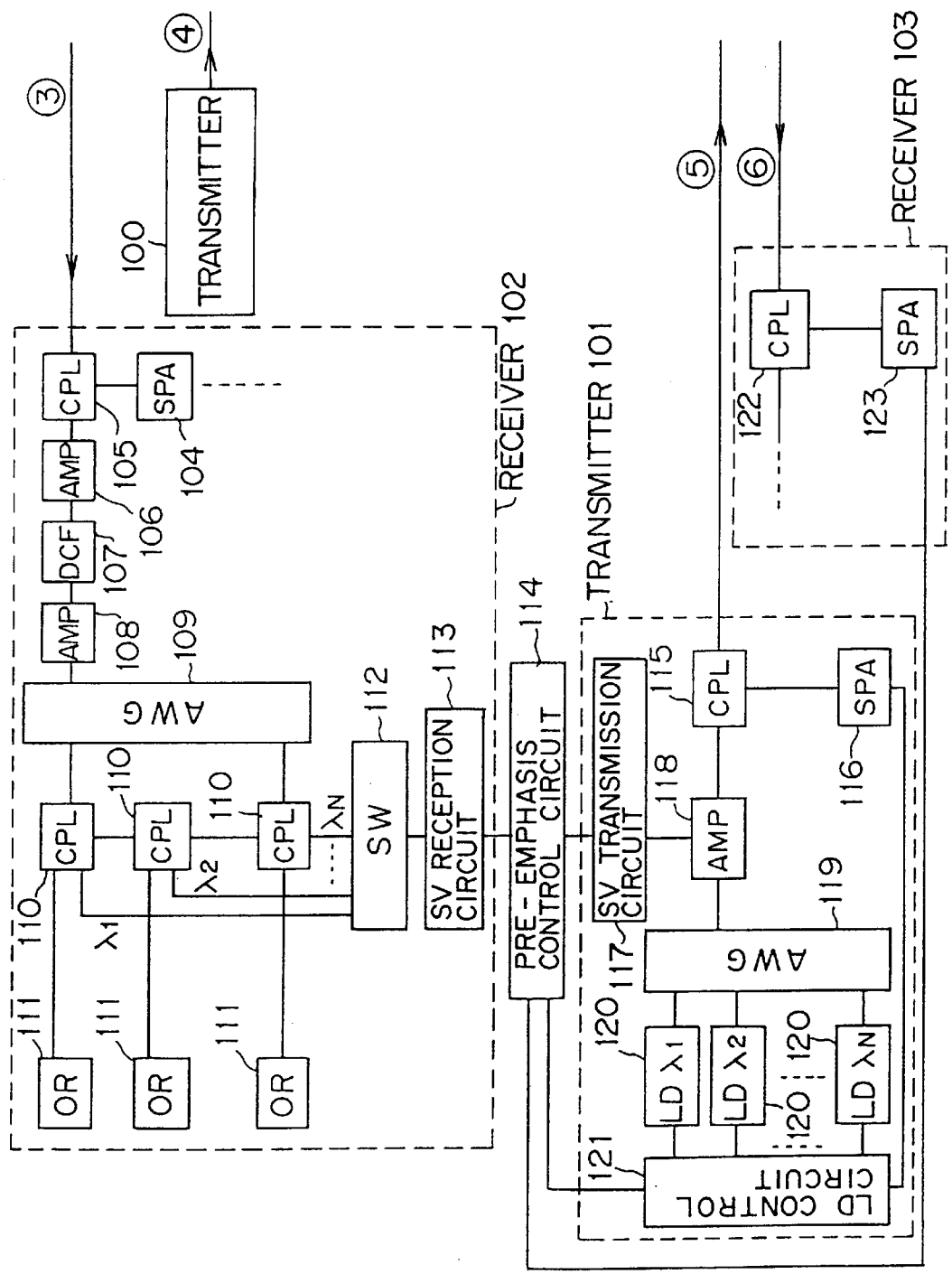
FIG. 9 is a diagram showing one example of the configuration of a branch station.

FIG. 9 is a diagram showing a configuration example of a branch station.

As shown in FIG. 7, since four transmission paths are connected to the branch station, two sets of a receiver and a transmitter are required. The circled numbers shown in FIG. 9 correspond to the circled numbers shown in FIG. 7, respectively.

Transmitters 100 and 101, and receivers 102 and 103 are provided at the branch station. Since the configurations of the respective transmitters and those of the respective receivers are the same, a single transmitter and a single receiver will be explained.

The spectrum information of an optical signal which is received by the receiver 103 is obtained to be inputted to a pre-emphasis control circuit 114. The configuration of the receiver 103 is the same as that of the receiver 102, the thus-inputted optical signal is branched by a coupler 105 to be inputted to a spectrum analyzer 104. The spectrum analyzer 104 analyzes the spectrum information to be obtained, and transmits this information to a pre-emphasis control circuit (for controlling the transmitter 100) which is not shown in the drawings.

An optical signal which passes through the coupler 105 passes through an optical amplifier 106, a dispersion compensation fiber 107, and an optical amplifier 108, thereby to be branched by an AWG 109 which is a demultiplexer. The optical signal of each wavelength is transmitted to an optical switch 112 by a coupler 110, and an SV signal is received by an SV reception circuit 113. The optical signal which passes through the coupler 110 is received by an optical receiver 111 for each wavelength. Information about a pre-emphasis process is obtained from the SV signal received by the SV reception circuit 113 to be inputted to a pre-emphasis control circuit 114.

An LD control circuit 121 controls the power of an LD 120 according to the instructions from the pre-emphasis control circuit 114, and performs a proper pre-emphasis process to the optical signal of each wavelength. Optical signals outputted from the LDs of respective wavelengths are multiplexed by the AWG 119 which is a multiplexer to be inputted to an optical amplifier 118. An amplification ratio of the optical amplifier 118 is varied by an SV transmission circuit 117 which is controlled by the pre-emphasis control circuit 114. The SV signal is superimposed on the main signal. Thus, a part of optical signals whose SV signals are superimposed is branched by a coupler 115, and the spectrum of the output optical signal is checked by a spectrum analyzer 116. The checked results are fedback to the LD control circuit 121, and each level of the LDs 120 is adjusted. Optical signals which pass through a coupler 115 are directly outputted to a transmission path.

Figure 10:
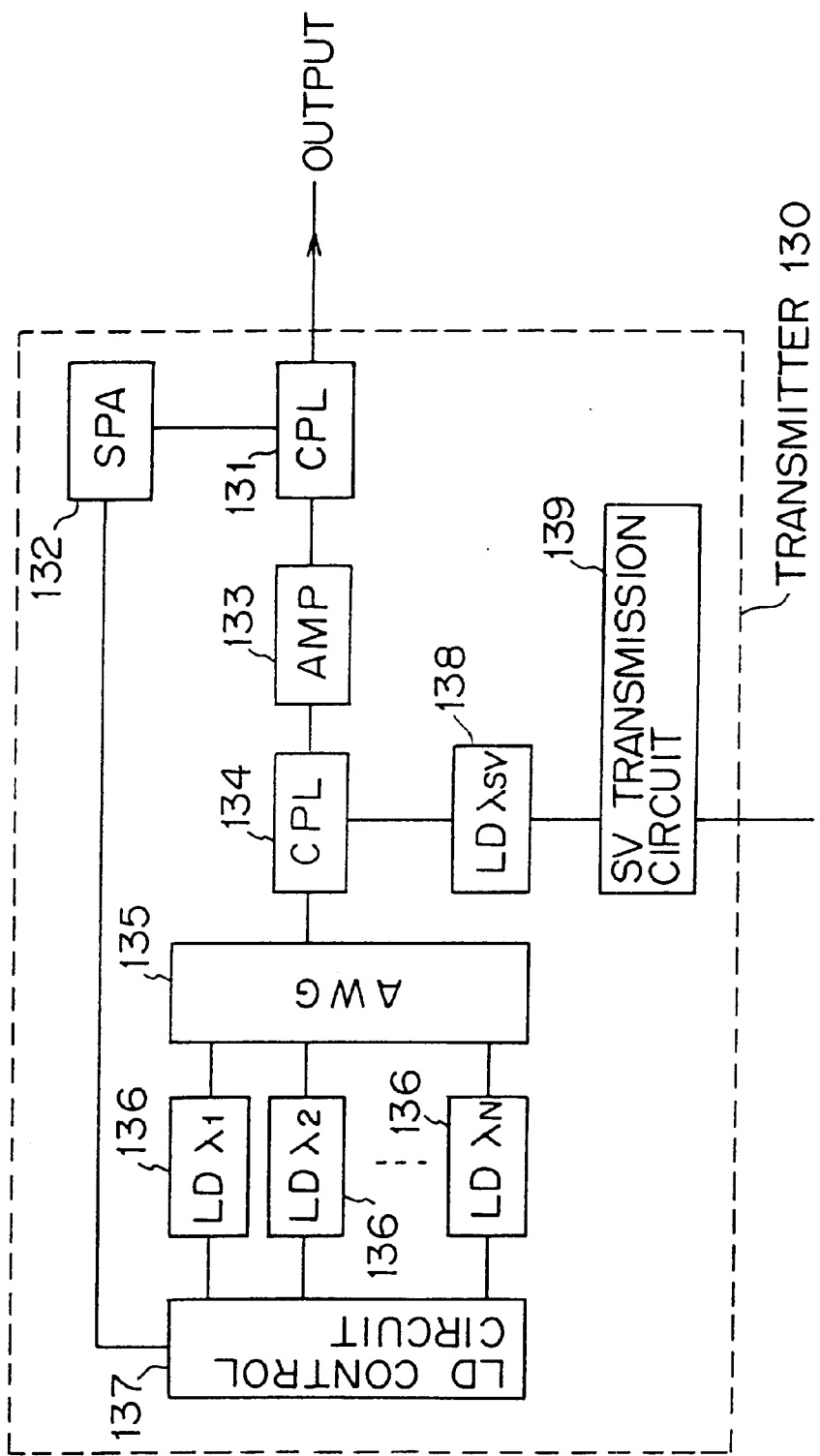
FIG. 10 is a diagram showing another configuration example of transmitters to be provided at a trunk station and at a branch station.

FIG. 10 is a diagram showing another configuration example of transmitters which are provided at a trunk station and branch station.

The configuration of this drawing shows that of a transmitter in the case where a wavelength exclusive for an SV signal is provided, and the SV signal is wavelength-multiplexed on a main signal to be transmitted.

The configuration of the transmitter 130 is almost the same as that of the above-mentioned transmitter. That is, an LD control circuit 137 for driving an LD 136 is provided, the spectrum information transmitted from a spectrum analyzer 132 is fedback, and the power levels of optical signals of respective wavelengths are adjusted. Optical signals outputted from the LDs of respective wavelengths are multiplexed by an AWG 135 which is a multiplexer to be inputted to a coupler 134. A coupler 134 generates an SV signal of light where an electric SV signal generated by an SV transmission circuit 139 is outputted from the LD 138 of a wavelength $\lambda$sv, and this SV signal is multiplexed with the main signal. The thus-generated optical signals are amplified by an optical amplifier 133, a part of the amplified optical signals is branched by a coupler 131, and the branched optical signal passes through a coupler 131 to be outputted to a transmission path. Optical signals branched by the coupler 131 are transmitted to the spectrum analyzer 132 to be used for the analysis of spectrum information.

FIG. 11 is a flowchart showing the processes which are performed when the computer of a trunk station controls a pre-emphasis process. Steps circled by dotted lines are not processes performed by the computer of the trunk station.

In step Si, first, a data request about the spectrum of a received optical signal is issued to each receiving station. Step S2 is a process to be performed by each receiving station. The OSNR of an optical signal of each wavelength is obtained from the data transmitted from a spectrum analyzer, and the data are transmitted to the computer of the trunk station. In step S3, when the computer receives the data, it requests each receiving station for the average of OSNRs and the deviation (ratio) of the respective signals. In step S4, a pre-emphasis process is set in such a manner that it becomes stronger when the deviation of the optical signals is lower than the average, and it becomes weaker when the deviation of the optical signals is higher than the average. In step: S5, a pre-emphasis instruction is transmitted to the transmission station of each optical signal. Step S6 shows the operations of a terminal station which receives the pre-emphasis instructions, and in this step, each transmission station performs a pre-emphasis process.

In step S7, the computer of a trunk station is waited until it receives the notice of a pre-emphasis termination. In step S8, the computer requests each station for data, and determines whether or not the data of each station satisfy standards when it receives the data (step S9). The standard represents an allowable range of how great an OSNR is allowed. Therefore, this range should be suitably established by the designer of a system.

When data do not satisfy the standards, the flow returns to step S3, and repeats steps until the data satisfy the standards. In step S9, when the data satisfy the standards, the pre-emphasis process is terminated.

Figure 12:
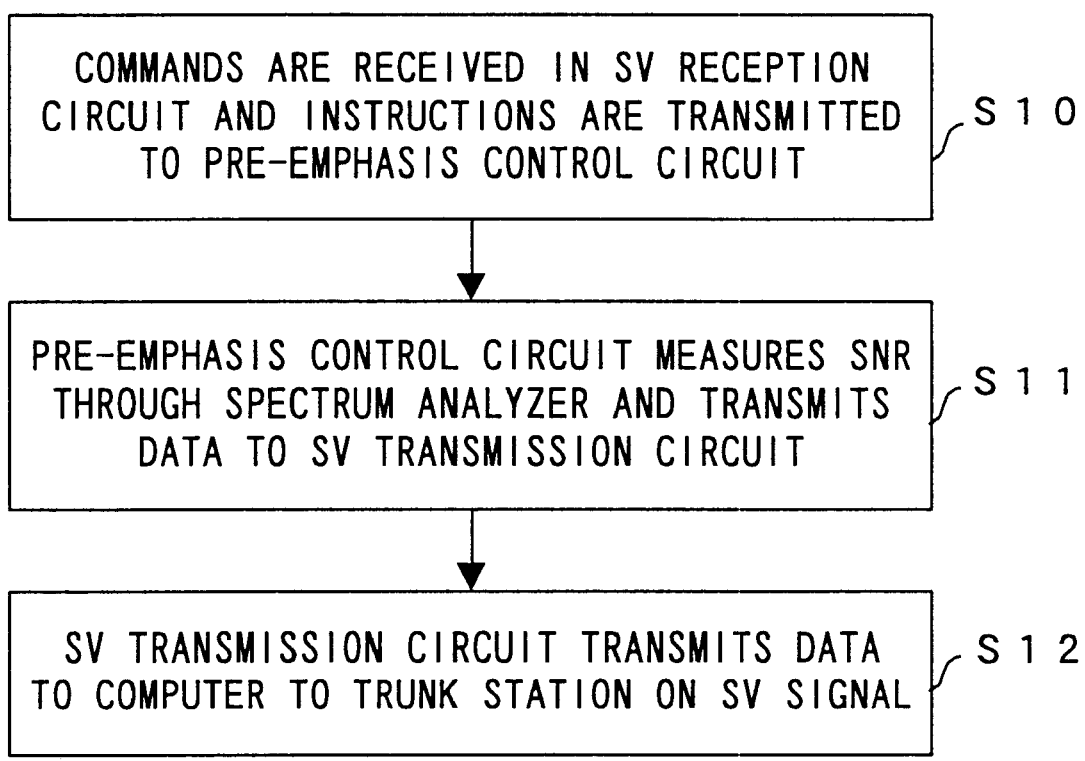
FIG. 12 is a flowchart explaining a data processing to be performed in a receiving station (No. 1)
Figure 13:
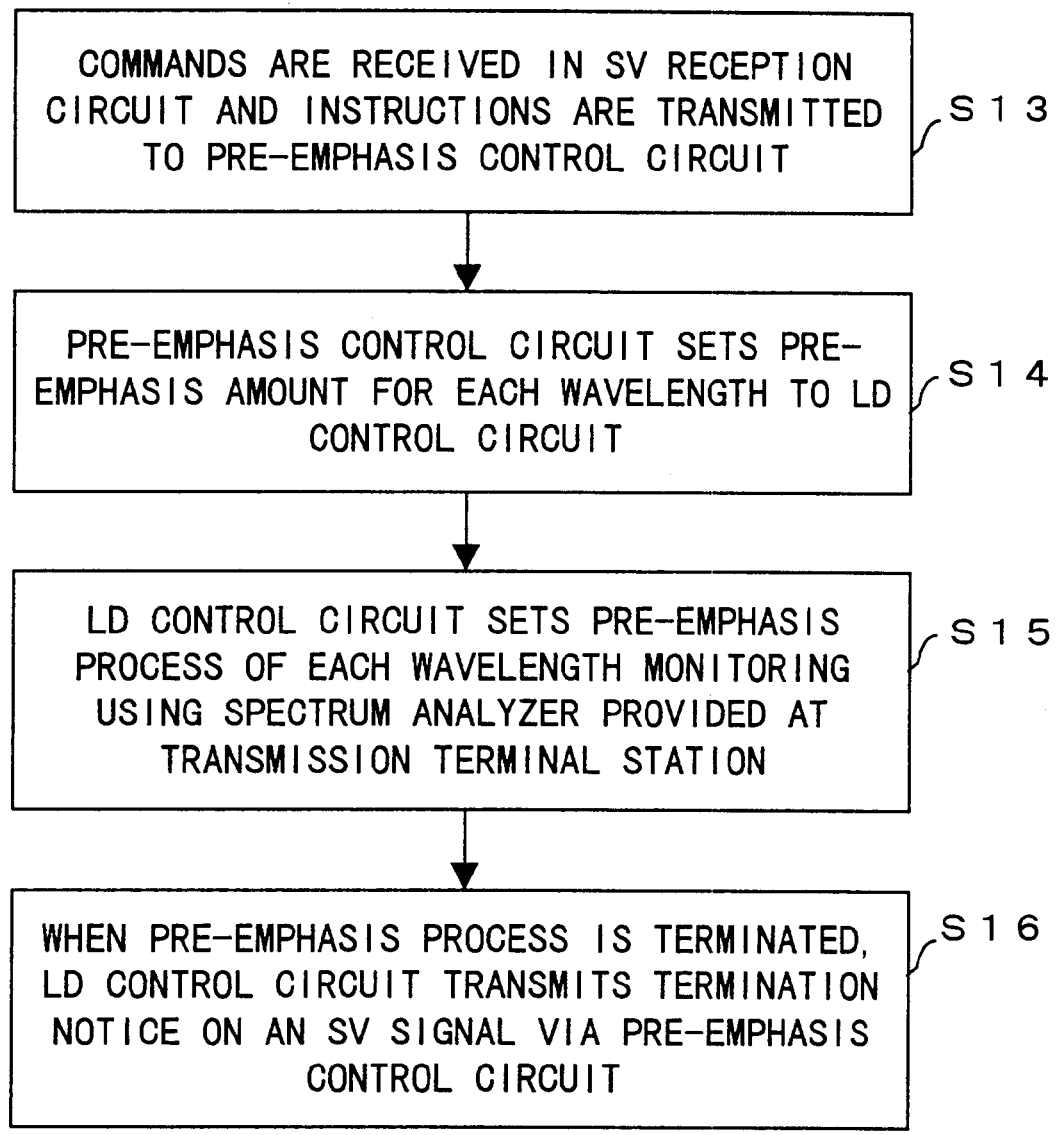
FIG. 13 is a flowchart explaining a data processing to be performed in a receiving station (No. 2)

FIGS. 12 and 13 are flowcharts explaining the data processes to be performed in receiving stations.

FIG. 12 is a flowchart showing the case where a data request is received. FIG. 13 is a flowchart showing the case where pre-emphasis execution commands are received.

When the data request is received as shown in FIG. 12, an SV reception circuit receives the data request commands, and transmits these commands to a pre-emphasis control circuit, in step S10. In step S11, the pre-emphasis control circuit measures OSNRs via a spectrum analyzer, and transmits the measured results to an SV transmission circuit. In step S12, the SV transmission circuit transmits the measured results to the computer of a trunk station which requests the results on an SV signal.

When pre-emphasis execution instructions are received, the SV reception circuit receives the commands of these instructions and transmits these commands to the pre-emphasis control circuit, in step S13. In step S14, the pre-emphasis control circuit sets. a pre-emphasis amount of each wavelength for the LD control circuit. In step S15, the LD control circuit sets the pre-emphasis amount of each wavelength monitoring via a spectrum analyzer which is provided at a transmission terminal station Finally in step S16, when the LD circuit terminates the pre-emphasis process, it transmits this termination on an SV signal via the pre-emphasis circuit.

Figure 14:
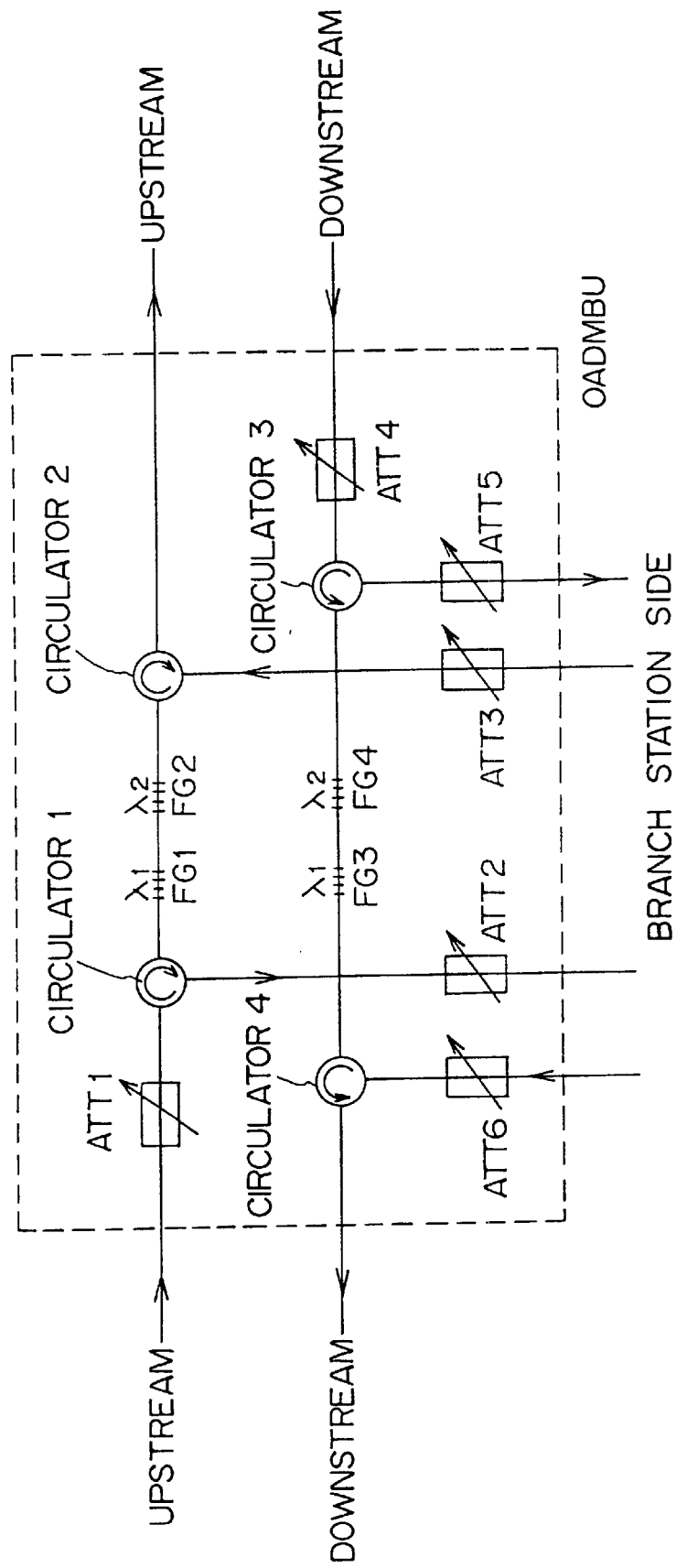
FIG. 14 is a diagram showing a case where dummy light is not used for adjusting all of the levels of optical signals.

FIG. 14 is a diagram showing the case where dummy light is not used for a level adjustment of all of the optical signals.

According to the above-mentioned, a case where after relative power levels of the respective wavelengths are adjusted, the power levels of all of the wavelengths are adjusted by adjusting the power levels of dummy lights. However, dummy light should not be always used for adjusting all of the power levels of optical signals.

That is, it is possible to be configured in such a way that SV signals or the like which are transmitted from an terminal station are received, and the attenuation amount is adjusted by providing variable attenuators ATT 1 to 6 in an OADM BU as shown in FIG. 14. As for an upstream line, a variable attenuator ATT 1 is provided at the entrance of the OADM BUS. It adjusts the levels of all of the optical signals which are transmitted from an upstream side. Optical signals which pass through a circulator 1 are inputted to a fiber grating FG1. In the case of FIG. 14, an optical signal of $\lambda 1$ is reflected to be dropped to a branch station side by the circulator 1. Further, an optical signal which passes through the fiber grating FG1 is transmitted to a fiber grating FG2, and an optical signal of wavelength $\lambda 2$ is reflected to be dropped to a branch station side. The thus-dropped optical signal is provided with a variable attenuator ATT 2. The operations of the variable attenuator ATT 2 adjusts the levels of all of the optical signals to be transmitted to a branch station, when two or more wavelengths are dropped, as shown in FIG. 14.

Optical signals which pass through the fiber gratings FG1 and FG2 are transmitted as through lights. Optical signals which are added to an upstream line from the branch station are inputted to a variable attenuator ATT 3, are inputted to a circulator 2 after the levels of all of the optical signals are adjusted, are reflected by the fiber gratings FG1 and FG2, and pass through the circulator 2 again to be transmitted. At this time, the variable attenuator ATT 3 adjusts the power levels of all of the optical signals transmitted from a branch station.

The downstream line is the same as the upstream line, and the power levels of all of the optical signals which are inputted from the downstream line are adjusted by a variable attenuator ATT 4. Optical signals of wavelengths $\lambda 1$ and $\lambda 2$ are dropped by the operations of a circulator 3, and fiber gratings FG3 and FG4. The levels of all of the thus-dropped optical signals are adjusted by a variable attenuator ATT 5. The levels of all of the optical signals to be added are adjusted by a variable attenuator ATT 6, and the thus-adjusted optical signals are added to through lights to be transmitted by the operations of the circulator 4 and the fiber gratings FG3 and FG4.

Thus, the adjustment of levels of all of the optical signals can be realized not only by using dummy light but also inserting at suitable spots variable attenuators which can vary an attenuation amount according to the instructions from terminal stations. Therefore, a person having an ordinary skill in the art can think about the other various methods. Consequently, the present invention is not restricted to the use of dummy light.

Figures 1A, 1B:
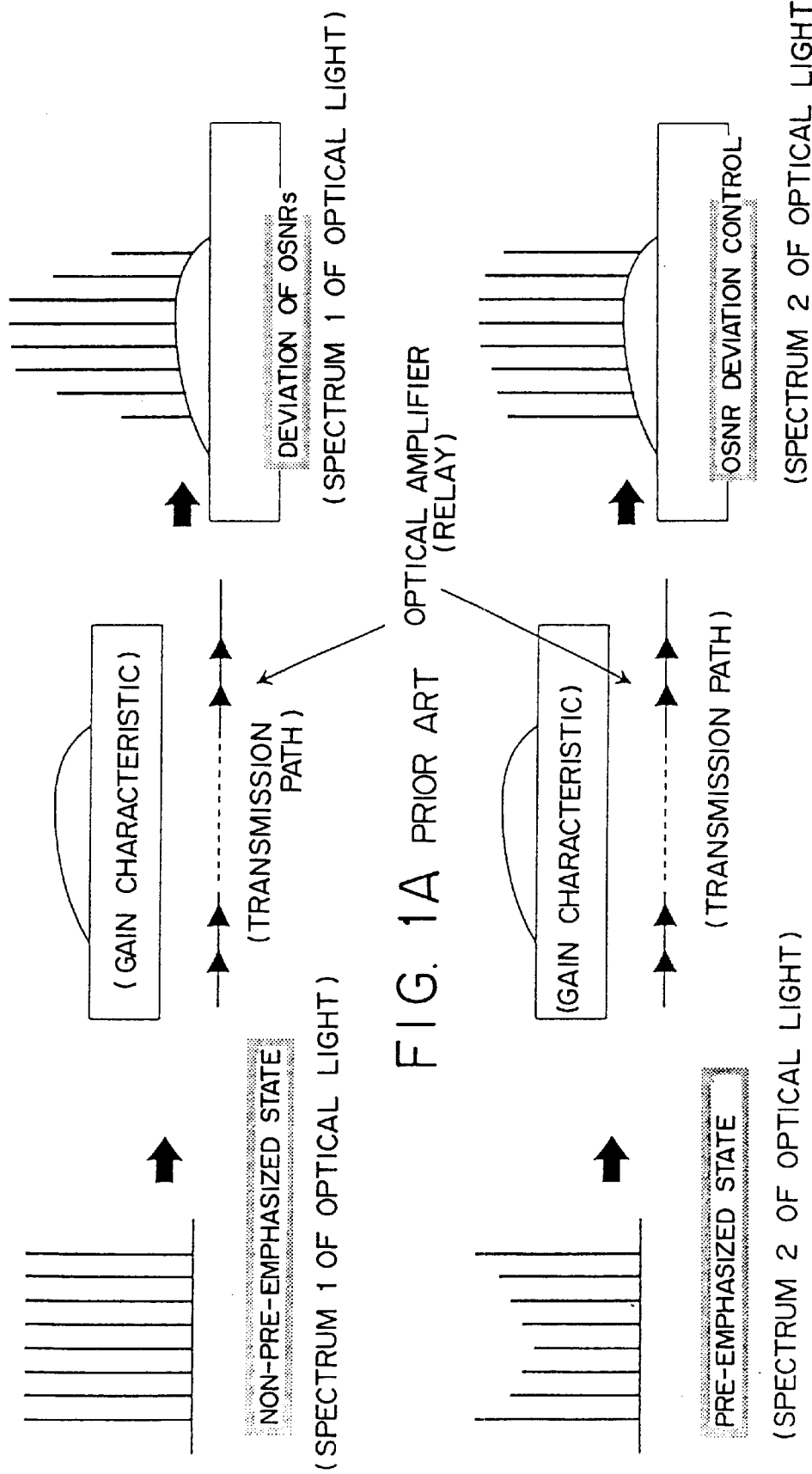
FIGS. 1A and 1B are diagrams explaining a pre-emphasis technology.

In the present embodiment, only a linear-type network with two trunk stations is explained. A link-shaped network configured in such a manner that a single trunk station is provided, a trunk transmission path is pulled out from the single trunk transmission path, and this path is terminated at the single trunk station can be also adopted. That is, a single trunk station is configured to have the function of a terminal station 10 as well as that of a terminal station 11, shown in FIG. 1.

According to the present invention, even if a plurality of terminal stations are connected to a trunk transmission path, specific wavelengths are dropped to the plurality of terminal stations, and they are added from the plurality of terminal stations, in an OADM system of WDM optical communication systems, an optimum pre-emphasis process can be automatically performed in short time, without causing any confusion.

What is claimed is:

1. A wavelength division multiplexing system in which a plurality of terminal stations are connected by a network, comprising:

a first terminal station comprising a control means for terminating a transmission path and for controlling a pre-emphasis process to be performed in a terminal station among respective terminal stations which are included in the wavelength division multiplexing system;

branching and inserting means for branching and inserting an optical signal of a predetermined wavelength among wavelength-multiplexed optical signals which propagate through the transmission path; and a second terminal station connected to the branching and inserting means, for receiving the optical signal of a predetermined wavelength from the transmission path, and for transmitting an optical signal of a predetermined wavelength to be inserted to the transmission path, wherein when a pre-emphasis process is performed for a wavelength-multiplexed optical signal to be transmitted in the wavelength division multiplexing system in a direction where the first terminal station is a receiving station, the control means obtains spectrum information of an optical signal received by the first terminal station, causes the second terminal station to transmit spectrum information of an optical signal to be received by the first terminal station, obtains spectrum information received from the second terminal station, and instructs a terminal station for transmitting optical signals about how great a pre-emphasis process should be performed, using spectrum information received from the first and the second terminal stations.

2. The system according to claim 1 wherein the spectrum information is S/N ratios of respective wavelengths which configure wavelength-multiplexed optical signals of the optical signal.

3. The system according to claim 2 wherein for each terminal station for receiving an optical signal, the control means averages the S/N ratios of respective corresponding wavelengths of the optical signal, and instructs, using a deviation between the S/N ratio of an optical signal of each wavelength and the average, a transmission station of the optical signal of how great a pre-emphasis process should be performed.

4. The system according to claim 1 wherein when performing a pre-emphasis process, a terminal station for transmitting the optical signal performs a relative level adjustment between optical signals of different wavelengths independently of a level adjustment of all of the optical signals which are obtained after the respective thus-level-adjusted optical signals are wavelength-multiplexed.

5. The system according to claim 4 wherein the level adjustment of all of the optical signals is performed by adjusting, using a wavelength different from a main signal containing information, a power level of light which is wavelength-multiplexed to the main signal.

6. The system according to claim 1 wherein the system is provided with a third terminal station opposite to the first terminal station which comprises the control means for performing a termination of a transmission path and for controlling a pre-emphasis process to be performed in a terminal station for transmitting an optical signal among respective terminal stations included in the wavelength division multiplexing system, and the first terminal station and the second terminal station are connected by a transmission path for transmitting an optical signal from the first terminal station to the third terminal station, and by a transmission path for transmitting an optical signal from the third terminal station to the first terminal station.

7. The system according to claim 6 wherein when a pre-emphasis process is performed to an optical signal to be transmitted from the first terminal station to the third terminal station, the control means of the third terminal station obtains spectrum information from its own station and the second terminal station, and performs a pre-emphasis process.

8. The system according to claim 6 wherein when a pre-emphasis process is performed to an optical signal to be transmitted from the first terminal station to the third terminal station, the control means of the first terminal station obtains spectrum information from the third terminal station and the second terminal station, and performs a pre-emphasis process.

9. The system according to claim 6 wherein when a pre-emphasis process is performed to an optical signal to be transmitted from the third terminal station to the first terminal station, the control means of the third terminal station obtains spectrum information from the first terminal station and the second terminal station, and performs a pre-emphasis process.

10. A terminal station for use in a wavelength division multiplexing system having a network configuration where a plurality of branch transmission paths are provided at a transmission path, and one or more terminal stations are connected to the branch transmission path, connected to the transmission path, the terminal station comprising:

control means for obtaining, from a terminal station for receiving a wavelength-multiplexed optical signal, spectrum information of an optical signal received by the terminal, and for instructing al terminal station for transmitting an optical signal of how great a pre-emphasis process should be performed according to the spectrum information; and pre-emphasis means for performing a pre-emphasis process according to instructions from the control means, and wherein the spectrum information is an S/N ratio of each wavelength of the received optical signal, and wherein the control means averages the S/N ratios corresponding to respective terminal stations which receive the wavelength-multiplexed optical signal, calculates a deviation between S/N ratios and the average, and instructs a terminal station for transmitting the optical signal of how great a pre-emphasis should be performed according to the deviation.

* * * * *